UNITED STATES PATENT OFFICE.

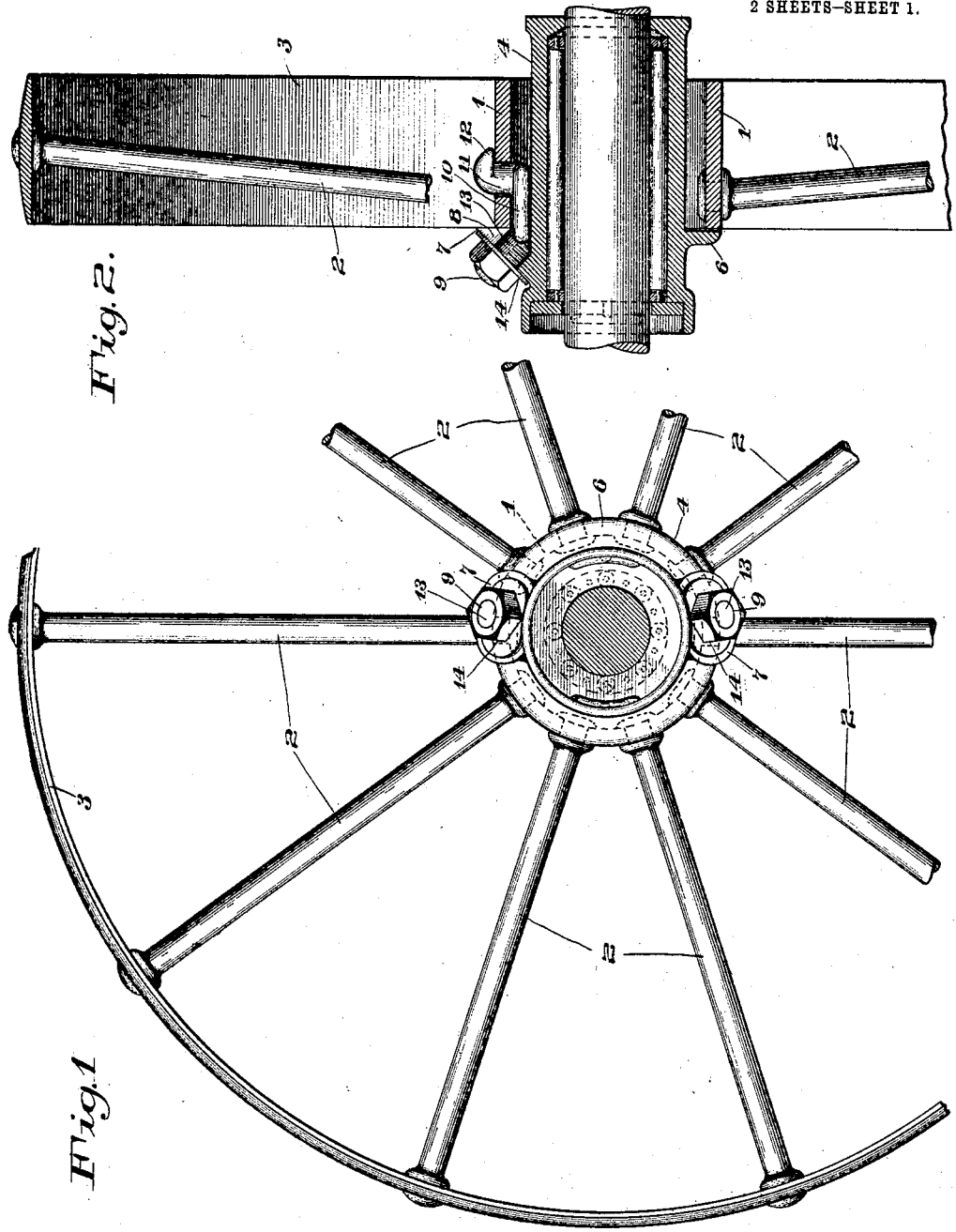

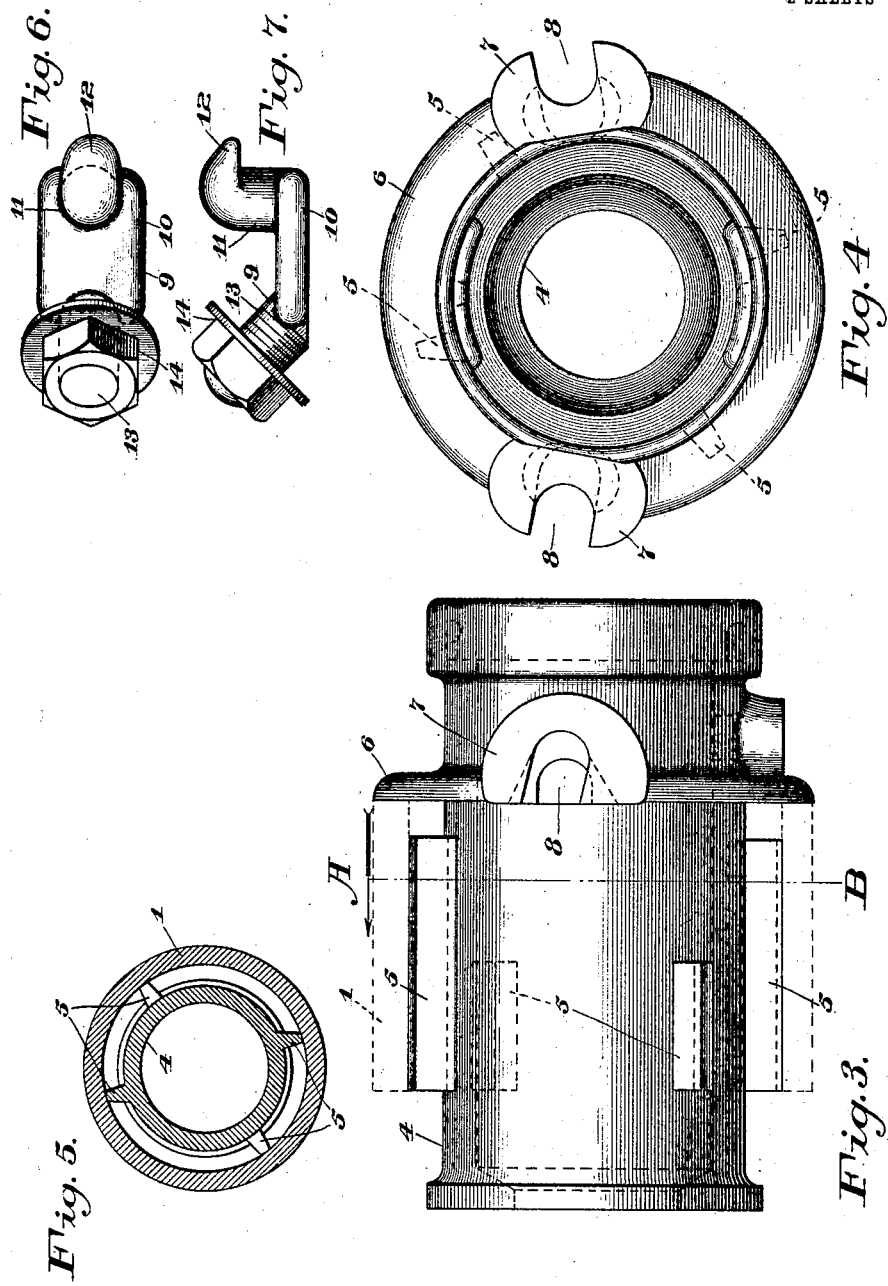

LUD HOLLAND-LETZ, OF CHICAGO, ILLINOIS, ASSIGNOR TO INTERNATIONAL HARVESTER COMPANY, A CORPORATION OF NEW JERSEY.

WHEEL-HUB AND BEARING-SLEEVE.

1,024,726.      Specification of Letters Patent.      Patented Apr. 30, 1912.

Application filed January 2, 1912. Serial No. 669,024.

*To all whom it may concern:*

Be it known that I, LUD HOLLAND-LETZ, a citizen of the United States, residing at Chicago, in the county of Cook and State of Illinois, have invented certain new and useful Improvements in Wheel-Hubs and Bearing-Sleeves, of which the following is a specification.

My invention relates to wheel hubs, and in particular to that class having a cylindrical shell to which are secured the inner ends of the spokes and a removable bearing sleeve received by the shell and secured therein; the object of my invention being to provide a hub and bearing sleeve that may be easily assembled and one in which the parts are rigidly secured in operative relation.

I attain these objects by means of the mechanism illustrated by the accompanying drawings, in which—

Figure 1 represents an inside end elevation of part of a wheel having my improved hub and bearing sleeve forming a part thereof; Fig. 2 is a vertical section of part of Fig. 1; Fig. 3 is a side elevation of the bearing sleeve; Fig. 4 is an end elevation of Fig. 3; Fig. 5 is a cross section of Fig. 3 on a smaller scale and along line A—B; Fig. 6 is a top plan view of one of the securing bolts; and Fig. 7 is a side elevation of Fig. 6.

The same reference characters designate like parts throughout the several views.

1 represents a cylindrical shell to which the inner ends of the spokes 2 of the wheel are secured, and 3 represents the wheel tire, to which the outer ends of the spokes are secured.

4 represents a bearing sleeve received by the shell and having longitudinally arranged ribs 5 thereon that engage with the inner surface of the shell in a manner to retain the sleeve in axial alinement therewith, the flange 6 forming a shoulder that engages with the end of the shell, boss portions 7 upon opposite sides of the periphery of the sleeve merging with the flange and inclining toward the ends of the sleeve, that are provided with radially arranged open ended slots 8 adapted to receive bolts 9 having a body portion 10 that extends longitudinally along the bearing sleeve, an upturned end 11 that is received by an opening in the wall of the shell, a lip portion 12 adapted to engage with the shell in a manner to retain the bolts in engagement therewith, and an outwardly inclined threaded portion 13 that is disposed at right angles to the face of the boss portion 7 that is adapted to receive a washer and nut 14 whereby the sleeve is rigidly secured to the shell forming the hub of the wheel.

In assembling the parts the bolts are placed in engagement with the openings in the shell, as shown in Fig. 2, the nuts being removed, and then the bearing sleeve may be inserted in the shell and the nuts replaced, thus providing a compact and rigid construction of wheel hub and bearing sleeve.

What I claim as being my invention, and desire to secure by Letters Patent, is:

A wheel including, in combination, spokes, a cylindrical shell having the inner ends of said spokes secured thereto, a bearing sleeve received by said shell, said sleeve being provided with a flange portion adapted to engage with the end of said shell, boss portions forming part of said flange and having surfaces that are inclined toward the ends of the sleeve, said boss portions being provided with radially arranged open ended slots, and bolts having angularly disposed portions at opposite ends thereof that are adapted to be received by openings in the wall of said shell and by said open ended slots.

LUD HOLLAND-LETZ.

Witnesses:
     C. G. GRZEGORZEWSK,
     E. L. BACON.